United States Patent [19]

Baur et al.

[11] Patent Number: 4,546,151
[45] Date of Patent: Oct. 8, 1985

[54] OXYALKYLATED POLYAMIDOAMINES AND THEIR PREPARATION

[75] Inventors: Richard Baur; Knut Oppenländer, both of Dannstadt-Schauernheim; Rainer Strickler, Heidelberg; Klaus Barthold, Mannheim, all of Fed. Rep. of Germany

[73] Assignee: BASF Aktiengesellschaft, Fed. Rep. of Germany

[21] Appl. No.: 568,831

[22] Filed: Jan. 6, 1984

[30] Foreign Application Priority Data

Jan. 13, 1983 [DE] Fed. Rep. of Germany ....... 3300866

[51] Int. Cl.$^4$ ............................................. C08G 69/48
[52] U.S. Cl. .................................... 525/430; 252/344; 528/323
[58] Field of Search ........................ 525/430; 528/323

[56] References Cited

U.S. PATENT DOCUMENTS

| | | | |
|---|---|---|---|
| 3,684,735 | 8/1972 | Oppenlaender et al. | 252/342 |
| 3,725,503 | 4/1973 | Kunde et al. | 525/430 |
| 3,839,372 | 10/1974 | Schneider | 528/335 |
| 3,907,701 | 9/1975 | Liebold et al. | 252/344 |
| 3,945,983 | 3/1976 | Hoppe et al. | 525/430 |

FOREIGN PATENT DOCUMENTS

| | | | |
|---|---|---|---|
| 2347932 | 4/1975 | Fed. Rep. of Germany | 525/430 |
| 1597097 | 9/1981 | United Kingdom . | |

*Primary Examiner*—Harold D. Anderson
*Attorney, Agent, or Firm*—Keil & Weinkauf

[57] ABSTRACT

Oxyalkylated polyamidoamines are obtained by reacting a polyamine with caprolactam and oxyalkylating the product with alkylene oxides, and are used for rapidly dewatering crude oil.

5 Claims, No Drawings

OXYALKYLATED POLYAMIDOAMINES AND THEIR PREPARATION

The present invention relates to oxyalkylated polyamidoamines which are obtained by reacting caprolactam with a polyamine, and their use as demulsifiers for rapidly dewatering crude oils.

Except in the initial production phase of an oilfield, oil is brought to the surface together with water of very variable salinity, mainly in the form of water-in-oil emulsions. These emulsions are generally broken by the addition of small amounts of surfactants, with or without heating, and are thus brought to the specification required for transporting or further processing. The different compositions of oils, and the various conditions under which they are recovered, make it necessary to use a variety of demulsifiers in order to achieve optimum separation, i.e. in order to obtain complete separation of the phases in a very short time under the particular conditions prevailing.

Usually, the necessary water-in-oil emulsions require a comparatively large amount of energy and, depending on the viscosity, have to be heated to 40° C., in some cases even to 80° C., in order to obtain the desired low water content by means of a chemical procedure or a combined electrical/chemical procedure.

Examples of suitable demulsifiers for oil emulsions are the reaction products of alkylene oxides with alkylphenol/aldehyde resins. Products of this type are described in German Pat. No. 2,013,820 (referred to below as resin demulsifiers).

Other suitable compounds are:
Reaction products as described in German Laid-Open Applications DOS No. 2,227,546 and/or DOS No. 2,435,713 (oxyalkylated polyalkylenepolyamines as well as quaternized polyalkylenepolyamine derivatives of this type; referred to below as polymin demulsifiers)
Mixtures of resin demulsifiers and polymin demulsifiers as described in German Laid-Open Application DOS No. 2,719,978.

Because of the different compositions of crude oils, it is virtually impossible to find a universal demulsifier for the entire range of crude oils occurring on the earth. However, it is still necessary to provide a single demulsifier for a relatively large range of related types of oils.

It is an object of the present invention to provide, as demulsifiers for oil emulsions, compounds which, alone or mixed with resin or polymin demulsifiers, enable water to be separated off very rapidly and completely for a very large number of types of oil, at a very low dosage and at low and high temperatures.

We have found that good results are achieved by means of novel oxyalkylated polyamidoamines which are obtained by reacting a polyamine with caprolactam and oxyalkylating the product with one or more alkylene oxides. Suitable oxyalkylated polyamidoamines are those which are obtained by reacting a polyamine containing from 3 to 5 amino or imino groups and from 4 to 20 carbon atoms with about a stoichiometric amount, based on the NH functions, or an excess of caprolactam, and oxyalkylating the product with from 10 to 30 moles, based on oxyalkylatable nitrogen valences, of one or more alkylene oxides.

Polyamidoamines are obtainable in a conventional manner by reacting a polyamine, e.g. diethylenetriamine, dipropylenetriamine, 3-(2-aminoethyl)-aminopropylamine, bis-(3-aminopropyl)-ethylenediamine, tripropylenetetramine, hexamethylenediamine or ethylenediamine, with caprolactam in a molar ratio of 1:2–1:8, but in at least about stoichiometric amounts, at 100°–200° C.

The reaction product of dipropylenetriamine with caprolactam in a molar ratio of about 1:3 is particularly preferred. The oxyalkylation may be carried out in a conventional manner with alkaline catalysis (NaOCH$_3$, KOH, NaOH or a basic ion exchanger) at 120°–150° C. and under superatmospheric pressure. Any conventional alkylene oxide, e.g. ethylene oxide, propylene oxide, 1,2-butylene oxide, 2,3-butylene oxide, styrene oxide or cyclohexene oxide, can be used in the oxyalkylation, specific examples being propylene oxide and ethylene oxide. It is preferable to use propylene oxide alone, or propylene oxide and ethylene oxide, which are subjected to the reaction, for example, as a block copolymerization.

In the oxyalkylation, as a rule, either 10–30 moles of propylene oxide alone, or 10–30 moles of propylene oxide and 2–15 moles of ethylene oxide, are reacted per oxyalkylatable nitrogen valence.

The compounds obtained can be used, in the absence of a solvent or in solution, as low-temperature or high-temperature demulsifiers for water-in-oil emulsions. Suitable solvents are water and organic solvents which boil at from 50° to 200° C., e.g. toluene, xylene, lower alcohols or naphthas.

Mixtures of the novel demulsifiers with polymin or resin demulsifiers can also be used very successfully.

Combining the substances results not just in an addition of the properties, but in the formation of oil emulsion demulsifiers with novel improved properties, which are presumably derived from a synergistic effect.

This is demonstrated by the results of comparative experiments in the examples. The preparation of component A of the mixture used there (polymin demulsifier) is disclosed in German Pat. No. 2,227,546.

The preparation of component B of the mixture (resin demulsifier) is described in German Pat. No. 2,013,820.

The content of the novel components in the mixtures with the conventional demulsifiers is, for example, from 40 to 60% by weight, while the content of component A or B is from 60 to 40% by weight. The novel demulsifier, either alone or as a mixture, is added to the crude oil emulsion advantageously in an amount of 1–10,000, preferably 10–1,000, ppm, based on the weight of the emulsion to be broken.

Suitable oils are crude oils of very different origin, but preferred oils are those from North West Germany and North Germany, having various water contents.

The separation experiments, the results of which are shown in the tables below and in which all unspecified parts and percentages are by weight, were carried out as follows:

Certain amounts (ppm), based on the weight of the emulsion, of a novel demulsifier or demulsifier mixture were added to 100 ml portions of crude emulsion having a certain water content. The mixture was stirred for 5 minutes in each case. The samples were then introduced into a graduated cylinder, and were left to stand at the stated temperatures.

The amount of water separated off in each case was measured at regular intervals of time.

PREPARATION EXAMPLES

Preparation of the polyamido component 918.4 g (7 moles) of dipropylenetriamine and 2,377.2 g (21 moles) of caprolactam were heated at 180° C. in a stream of nitrogen. The mixture was stirred for 17 hours at 180° C., after which the temperature was increased to 190° C. and the mixture was stirred for a further 5 hours.

3,246.6 g of a polyamidoamine of melting point 110° C. were obtained.

The amine number was 7.27 meq/g, and the product contained about 11% of 6-aminohexanoic acid.

EXAMPLE 1

947 g (16.32 moles) of propylene oxide were forced a little at a time, in the course of 6 hours, under 6–10 bar and at 135° C., into a stirred $V_2A$ stainless steel autoclave containing 72.5 g (0.154 mole) of the polyamido component prepared as described above and 1 g of KOH powder.

Stirring was then continued for a further 4 hours until the pressure remained constant. The product can be used directly. As adduct of about 106 moles of propylene oxide with one mole of the polyamidoamine was formed.

EXAMPLE 2

1,128 g (19.4 moles) of propylene oxide and then 365 g (8.3 moles) of ethylene oxide were forced a little at a time, in the course of 10 hours at 135° C. and under 6–10 bar, into a stirred $V_2A$ stainless steel autoclave containing 84.7g (0.18 mole) of the polyamido component and 1 g of KOH powder, and the mixture was then stirred for a further 4 hours until the pressure remained constant. The product can be used directly. An adduct of about 108 moles of propylene oxide and 46 moles of ethylene oxide with one mole of the polyamidoamine was formed.

EXAMPLE 3

The procedure described in Example 2 was followed, and 108 g (0.23 mole) of the polyamido component were reacted with 1,040 g (17.9 moles) of propylene oxide and then with 304 g (6.9 moles) of ethylene oxide.

The product can be used directly. An adduct of about 78 moles of propylene oxide and 30 moles of ethylene oxide with one mole of the polyamidoamine was formed.

EXAMPLE 4

197.5 g (0.03 mole) of the oxypropylate described in Example 1 and 1 g of KOH powder were reacted with 53 g (1.2 moles) of ethylene oxide in a stirred $V_2A$ stainless steel autoclave in the course of 3 hours under a pressure of from 6 to 10 bar at 125° C.

The mixture was then stirred for a further 4 hours until the pressure remained constant. Analysis showed that the resulting adduct contained about 106 moles of propylene oxide and about 40 moles of ethylene oxide per mole of polyamidoamine.

Comparative demulsifier C

Polymin 1,000/90 PrO according to German Pat. No. 2,227,546 (polyethyleneimine containing on average 1,000 repeating ethyleneimine units and oxyalkylated with 90 moles of propylene oxide per NH valence).

Comparative demulsifier D

Oxyalkylated isononylphenol/formaldehyde resin containing 4.9 ethylene oxide units per benzene nucleus, as described in German Pat. No. 2,013,820.

Comparative demulsifier D is obtained as follows:

Oxyalkylated isoalkylphenol/formaldehyde resin

I. Condensation 1,100 parts (5 moles) of isononylphenol are dissolved in 0.7 part by volume of xylene at 40° C., and 500 parts (about 5 moles) of a 30% strength aqueous formaldehyde solution are then added in the course of 1.5 hours. 0.04 part by volume (about 0.4 mole) of concentrated hydrochloric acid and 3 parts of a pulverulent dodecylbenzenesulfonate are added, and the mixture is then refluxed for 5 hours. After 7 hours, 470 parts of water containing hydrochloric acid are separated off, the temperature being increased to 150° C.

Yield: 1,930 parts.
Acid number: 53.
Hydroxyl number: 302.

The resin obtained contains from 4 to 6 benzene nuclei per molecule.

II. Oxyethylation 127 parts (75 parts of 100% strength product) of this isononylphenol/formaldehyde resin in xylene, together with 0.65 part (0.5 percent by weight, based on resin) of sodium hydroxide solution, are reacted a little at a time with 70 parts of ethylene oxide in the course of from 3 to 5 hours under from 2.5 to 7 atm gage pressure in a stirred autoclave. 195 parts (theory: 197 parts) of a medium-brown viscous product are obtained as a 74 percent strength by weight solution in xylene.

Acid number of the 100% strength product: 0.
Hydroxyl number of the 100% strength product: 120–135.
$\eta$: 50% strength solution in xylene: 16.5 mPa.s.

The resulting compound contains 4.9 alkylene oxide units per benzene nucleus.

Component A of the mixture

Polymin 1,000/38 EO/72 PrO as described in German Pat. No. 2,227,546 (Polyethyleneimine containing on average 1,000 repeating ethyleneimine units, oxyalkylated with 38 moles of ethylene oxide and 72 moles of propylene oxide per NH valence).

Component B of the mixture

Oxyalkylated isononylphenol/formaldehyde resin containing 5.5 ethylene oxide units per benzene nucleus, as described in German Pat. No. 2,013,820 (The preparation corresponds to that of comparative demulsifier D. In the oxyalkylation, 80 parts of ethylene oxide are used instead of 70 parts as above).

TABLE 1

North German crude oil, 40% of $H_2O$, stirred experiment at 27° C.

| Product | Amount ppm | Amount of $H_2O$ (in cm³) separated off after | | | | | |
|---|---|---|---|---|---|---|---|
| | | 20 min | 40 min | 60 min | 2 h | 4 h | 16 h |
| Comparative demulsifier C | 30 | 0 | 3 | 4 | 6 | 10 | 14 |
| Comparative demulsifier D | 30 | 2 | 3 | 4 | 8 | 11 | 29 |
| Product described in 2 | 30 | 5 | 8 | 11 | 30 | 35 | 38 |

TABLE 1-continued

North German crude oil, 40% of H₂O, stirred experiment at 27° C.

| Product | Amount ppm | \multicolumn{6}{c}{Amount of H₂O (in cm³) separated off after} |
|---|---|---|---|---|---|---|---|
| | | 20 min | 40 min | 60 min | 2 h | 4 h | 16 h |
| Product described in 3 | 30 | 4 | 7 | 10 | 20 | 32 | 35 |
| Mixture C + D | 30 | 2 | 3 | 4 | 6 | 13 | 28 |
| Mixture 2 + D | 30 | 5 | 13 | 21 | 35 | 38 | 40 |

TABLE 2

North German crude oil, 60% of H₂O, stirred experiment at 27° C.

| Product | Amount ppm | 20 min | 40 min | 60 min | 2 h | 4 h | 16 h |
|---|---|---|---|---|---|---|---|
| Comparative demulsifier D | 150 | 0 | 0 | 6 | 13 | 31 | 52 |
| Product described in 1 | 150 | 4 | 11 | 21 | 30 | 40 | 58 |
| Product described in 4 | 150 | 5 | 13 | 16 | 31 | 50 | 58 |
| Mixture 4 + D | 150 | 13 | 22 | 25 | 40 | 54 | 56 |

TABLE 3

North German crude oil, 40% of H₂O, stirred experiment at 60° C.

| Product | Amount ppm | 20 min | 40 min | 60 min | 2 h | 4 h | 16 h |
|---|---|---|---|---|---|---|---|
| Comparative demulsifier C | 30 | 0 | trace | 2 | 4 | 6 | 21 |
| Product described in 1 | 30 | 0 | 1 | 5 | 7 | 13 | 31 |
| Product described in 2 | 30 | 2 | 7 | 10 | 21 | 26 | 33 |
| Product described in 3 | 30 | 3 | 6 | 12 | 24 | 27 | 33 |

TABLE 4

North German crude oil, 42% of H₂O, shaken experiment at 27° C.

| Product | Amount ppm | 20 min | 40 min | 60 min | 2 h | 4 h | 16 h |
|---|---|---|---|---|---|---|---|
| Mixture of comparative demulsifiers C and D | 100 | 1 | 8 | 10 | 20 | 38 | 40 |
| Product described in 2 | 100 | 10 | 20 | 30 | 37 | 39 | 41 |
| Mixture of 2 and B | 100 | 28 | 40 | 40 | 40 | 41 | 42 |
| Mixture of 2 and A | 100 | 27 | 36 | 37 | 39 | 40 | 41 |

We claim:

1. An oxyalkylated polyamidoamine which is the reaction product of a polyamine containing from 3 to 5 amino or imino groups and from 4 to 20 carbon atoms with at least an approximately stoichiometric amount, based on the NH functions, of caprolactam, oxyalkylated with from 10 to 30 moles, per equivalent of oxyalkylatable nitrogen valences, of alkylene oxide.

2. An oxyalkylated polyamidoamine as defined in claim 1, in which the molar ratio of polyamine units to caprolactam units is from 1:2 to 1:8.

3. An oxyalkylated polyamidoamine as defined in claim 1, in which the alkylene oxide units are propylene oxide units or a mixture of ethylene oxide and propylene oxide units.

4. A process for the preparation of an oxyalkylated polyamidoamine as defined in claim 1, wherein a polyamine as specified in claim 1 is reacted with caprolactam in a molar ratio of from 1:2 to 1:8 at from 100° to 200° C., and the product is reacted with from 10 to 30 moles, per equivalent of oxyalkylatable nitrogen functions, of an alkylene oxide.

5. A process as defined in claim 4, in which the oxyalkylated product is obtained by
   (a) oxypropylation,
   (b) oxypropylation followed by oxyethylation, or
   (c) oxyethylation followed by oxypropylation.

* * * * *